(12) United States Patent
Donselaar

(10) Patent No.: US 6,840,027 B2
(45) Date of Patent: Jan. 11, 2005

(54) FORAGE CONDITIONER-TEDDER

(75) Inventor: Stuart Van Donselaar, New Sharon, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 10/402,543

(22) Filed: Mar. 28, 2003

(65) Prior Publication Data

US 2004/0187458 A1 Sep. 30, 2004

(51) Int. Cl.$^7$ .............................................. A01D 61/00
(52) U.S. Cl. ................................................. 56/16.4 R
(58) Field of Search ........................... 56/6, 192, 13.6, 56/15.9, 16.4 R, 193, 16.4

(56) References Cited

U.S. PATENT DOCUMENTS

| | | | |
|---|---|---|---|
| 4,117,653 A | * | 10/1978 | Tarver, Jr. ..................... 56/13.6 |
| 4,215,526 A | * | 8/1980 | van der Lely ............... 56/12.7 |
| 4,233,805 A | * | 11/1980 | van der Lely ................ 56/192 |
| 4,269,019 A | | 5/1981 | Strobel |
| 4,292,789 A | * | 10/1981 | Mathews ..................... 56/12.7 |
| 4,395,866 A | * | 8/1983 | Mathews ................. 56/16.4 R |
| 4,478,027 A | * | 10/1984 | De Coene et al. ....... 56/16.4 R |
| 4,487,003 A | * | 12/1984 | Mathews et al. ............ 56/13.6 |
| 4,694,640 A | | 9/1987 | Ermacora |
| 4,860,527 A | * | 8/1989 | Maarten ..................... 56/13.6 |
| 5,605,032 A | | 2/1997 | Gantzer |
| 5,784,866 A | | 7/1998 | Campbell |
| 5,842,330 A | * | 12/1998 | Richardson et al. ............. 56/6 |
| 6,026,635 A | * | 2/2000 | Staiger ........................ 56/295 |
| 2002/0026778 A1 | | 3/2002 | Koorn |

FOREIGN PATENT DOCUMENTS

EP  1 5 60 173  1/1980

* cited by examiner

Primary Examiner—Arpad Fabian Kovacs
(74) Attorney, Agent, or Firm—Sturm & Fix LLP

(57) ABSTRACT

Hay and forages, these days, are often mown, conditioned, and tedded. A disc mower with strap-type protrusions or fingers extending radially outward from the shaft turning the discs and extending upward from the cutting knives several inches will provide each of these three actions at once.

17 Claims, 19 Drawing Sheets

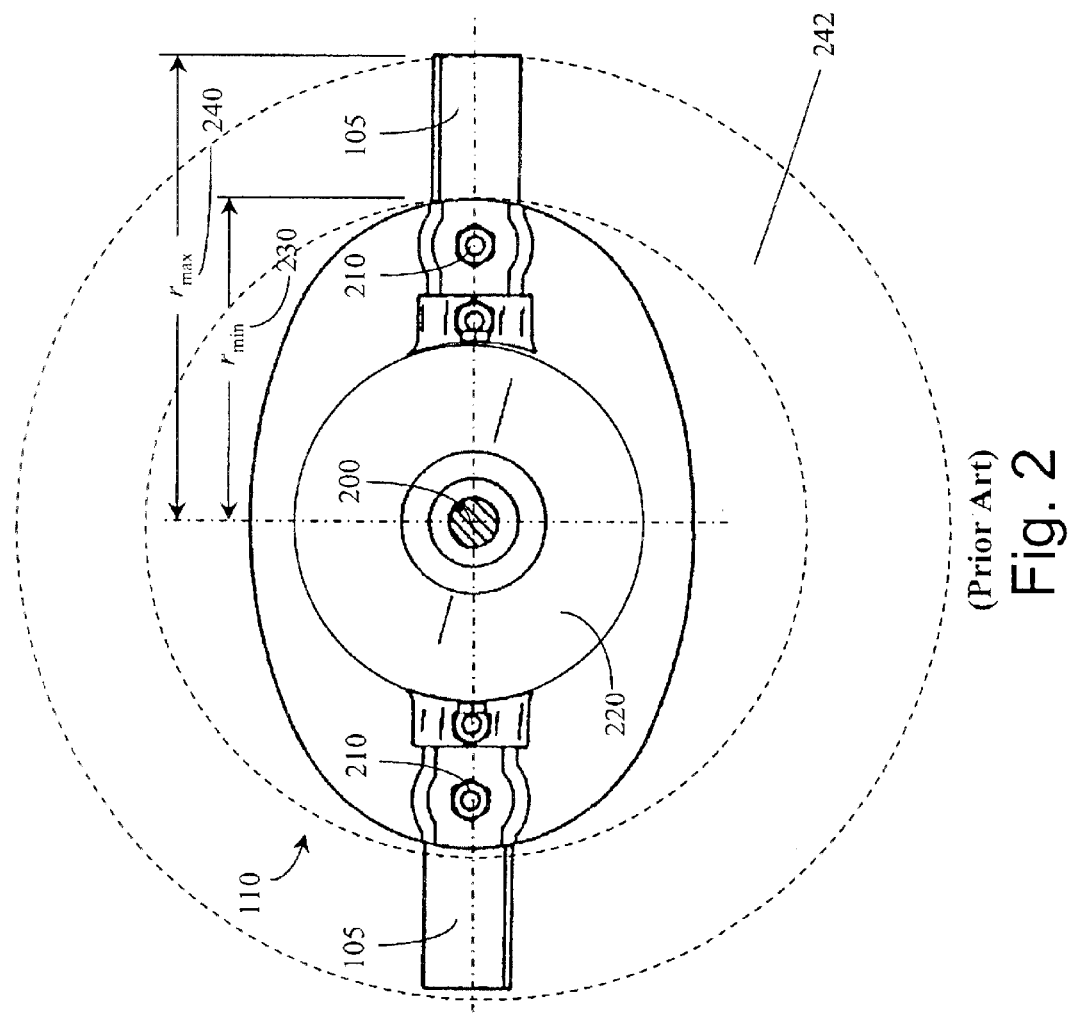

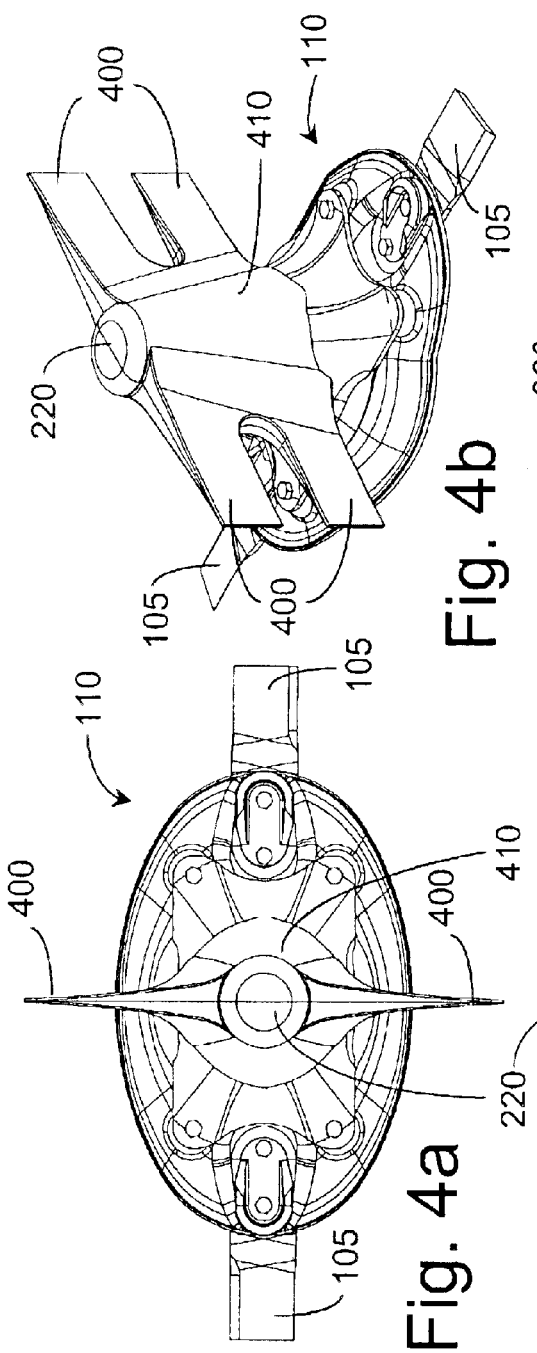
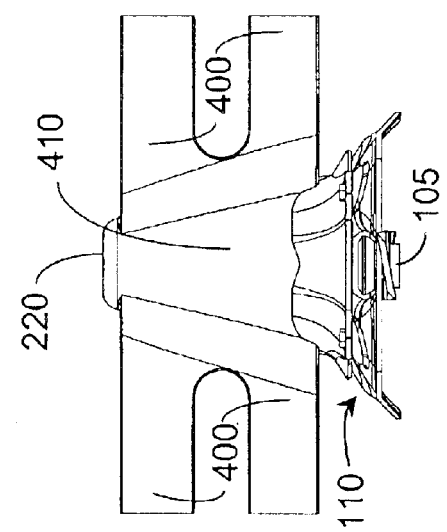
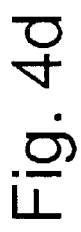
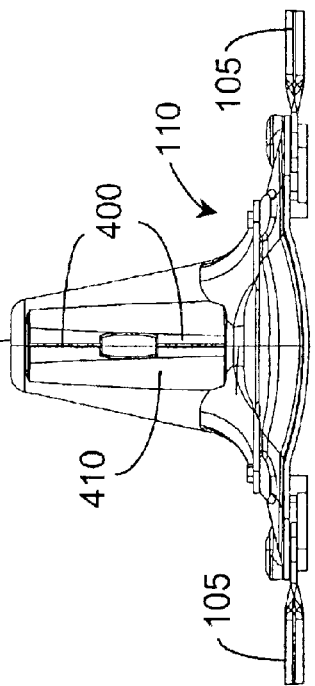

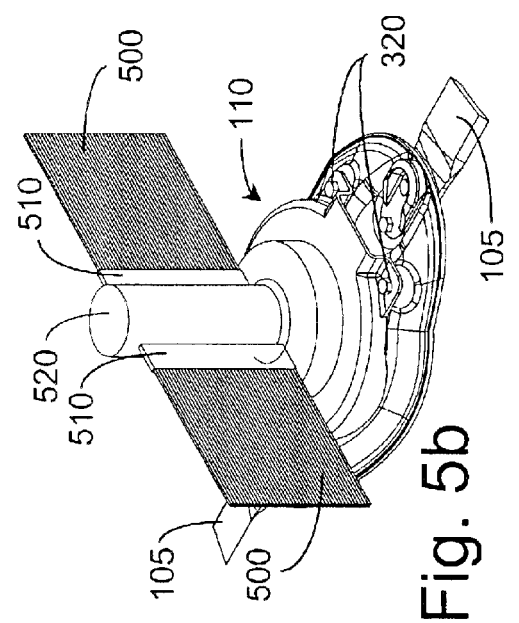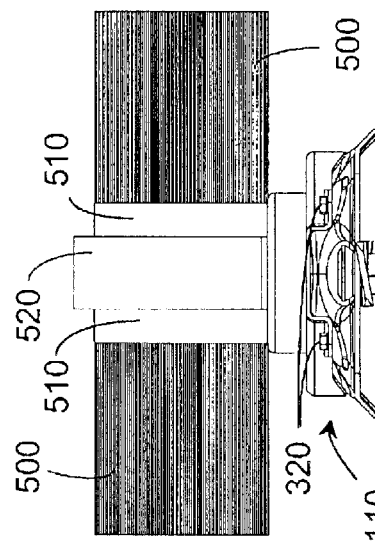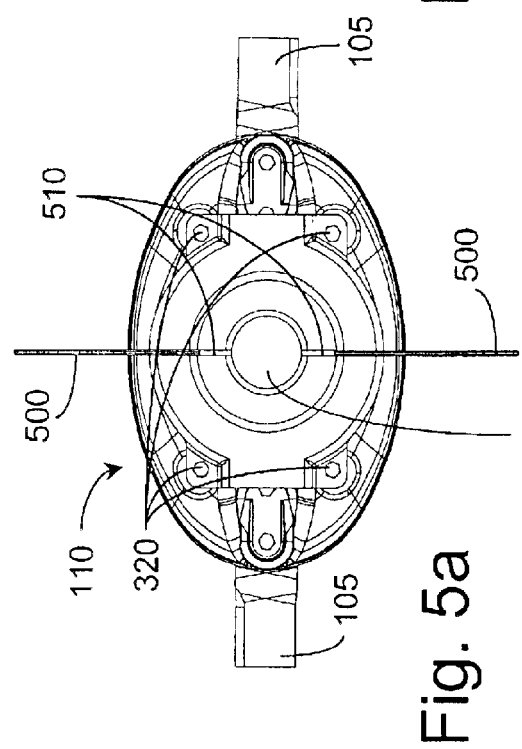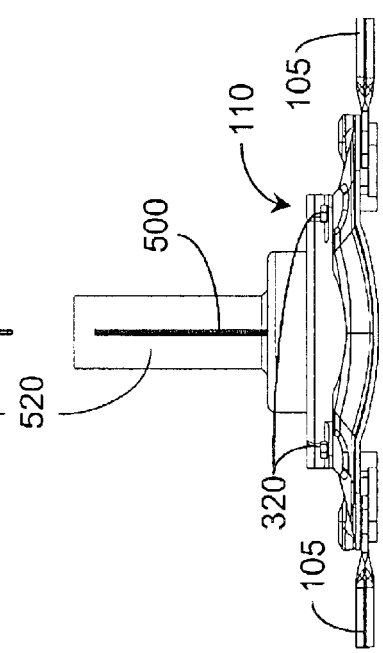

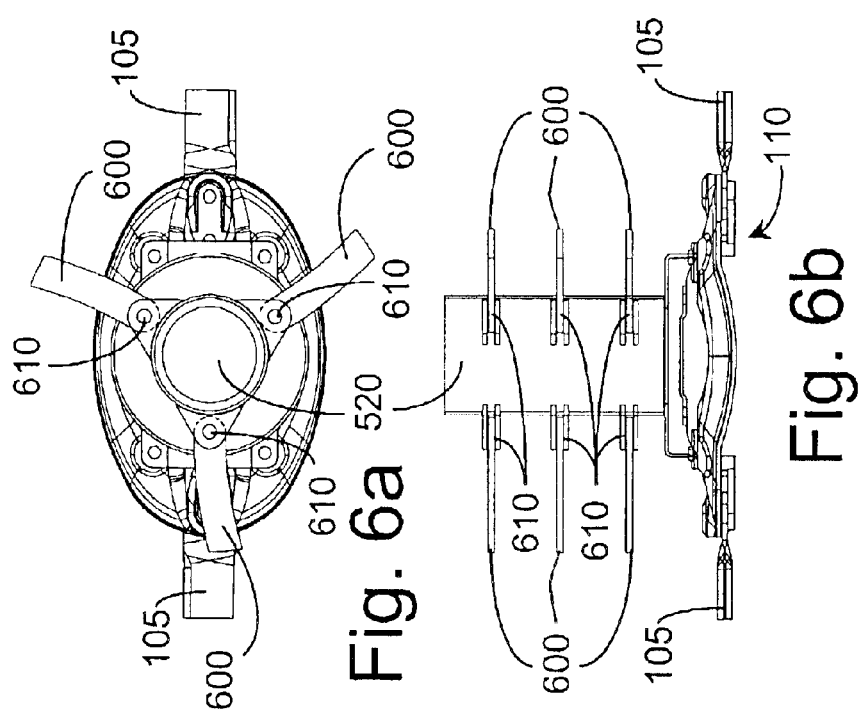

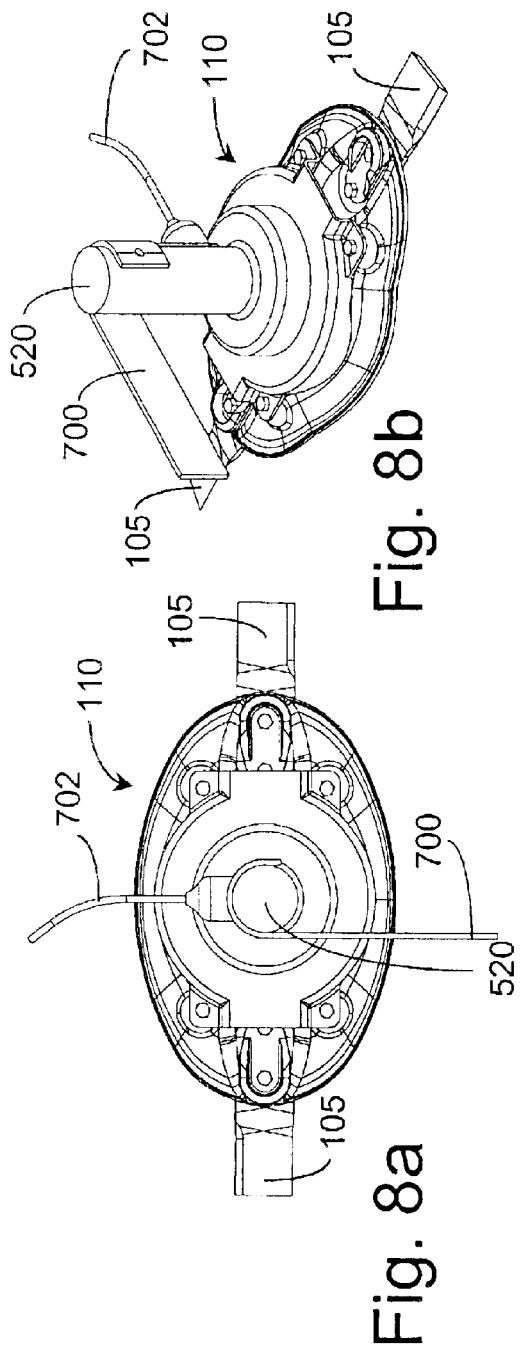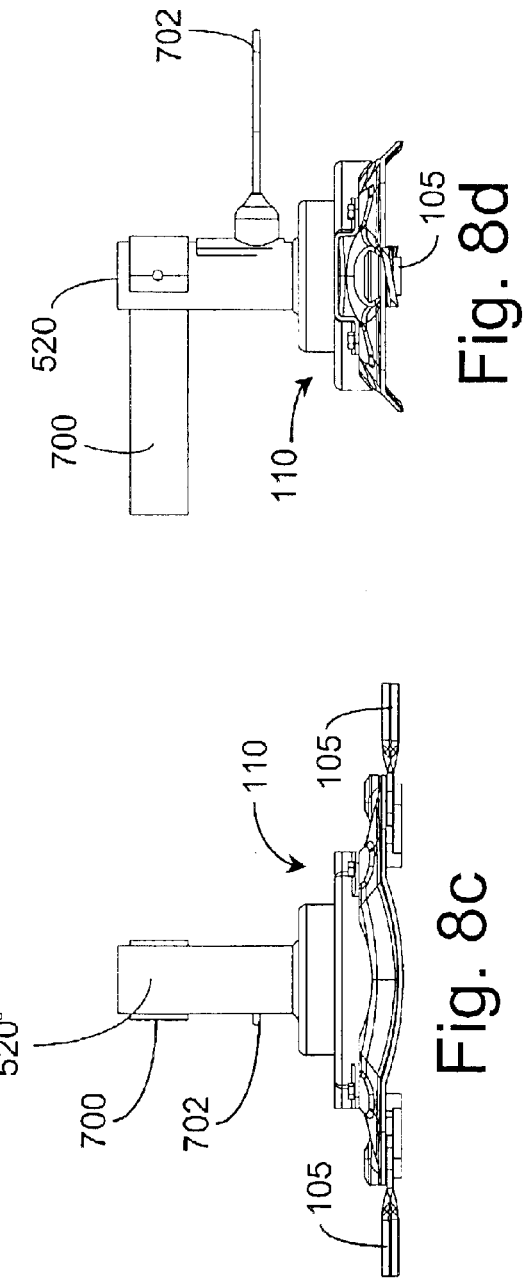

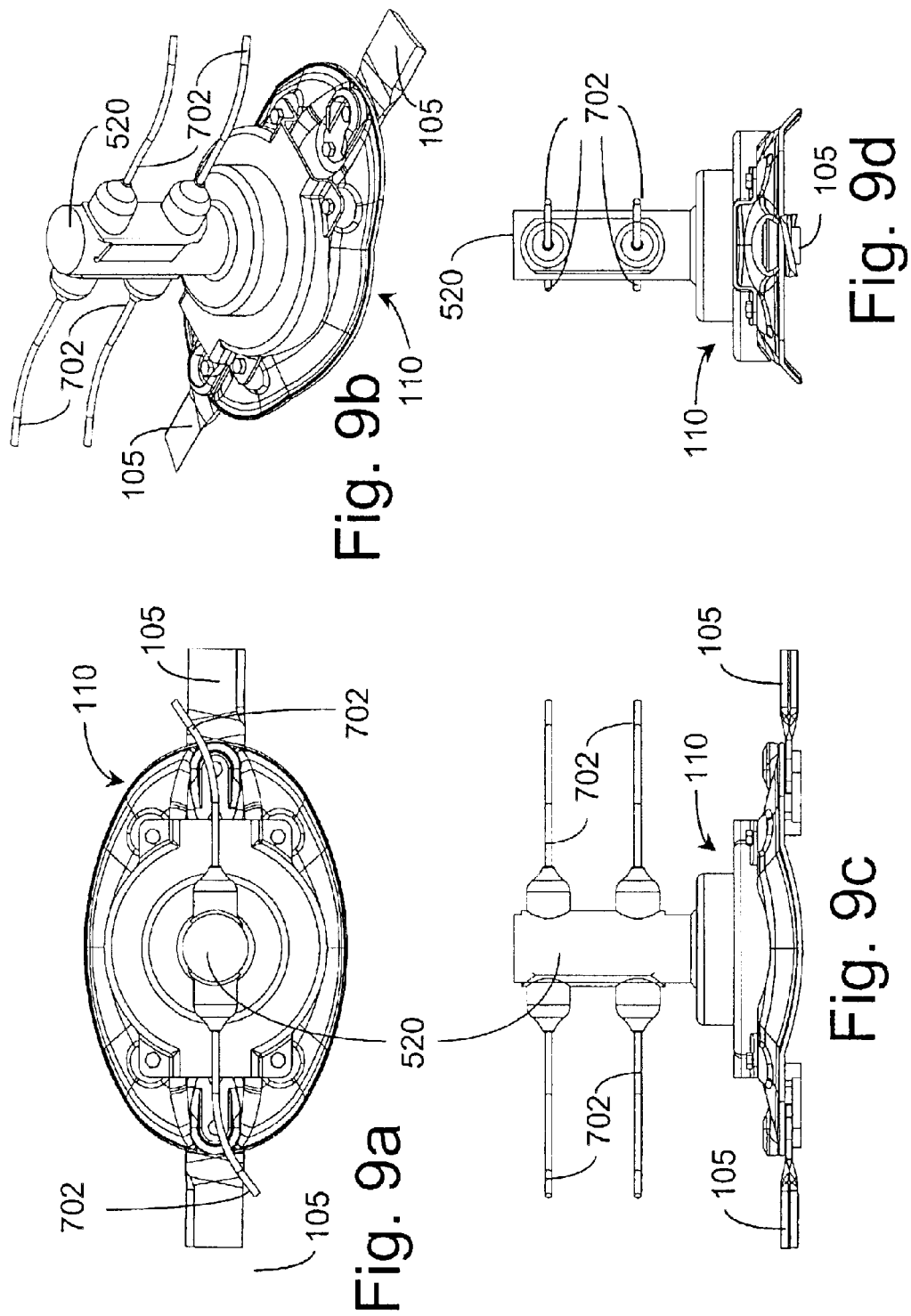

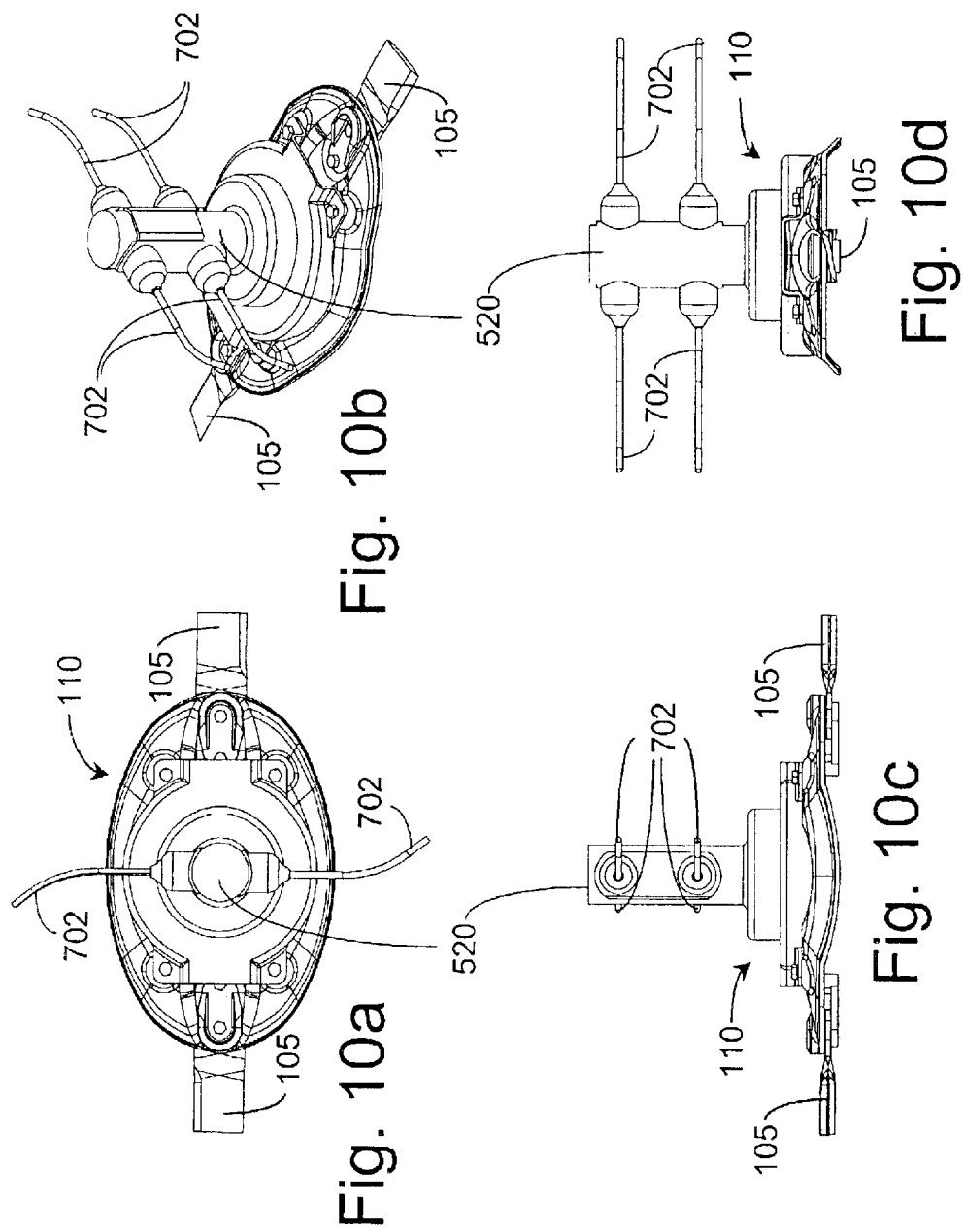

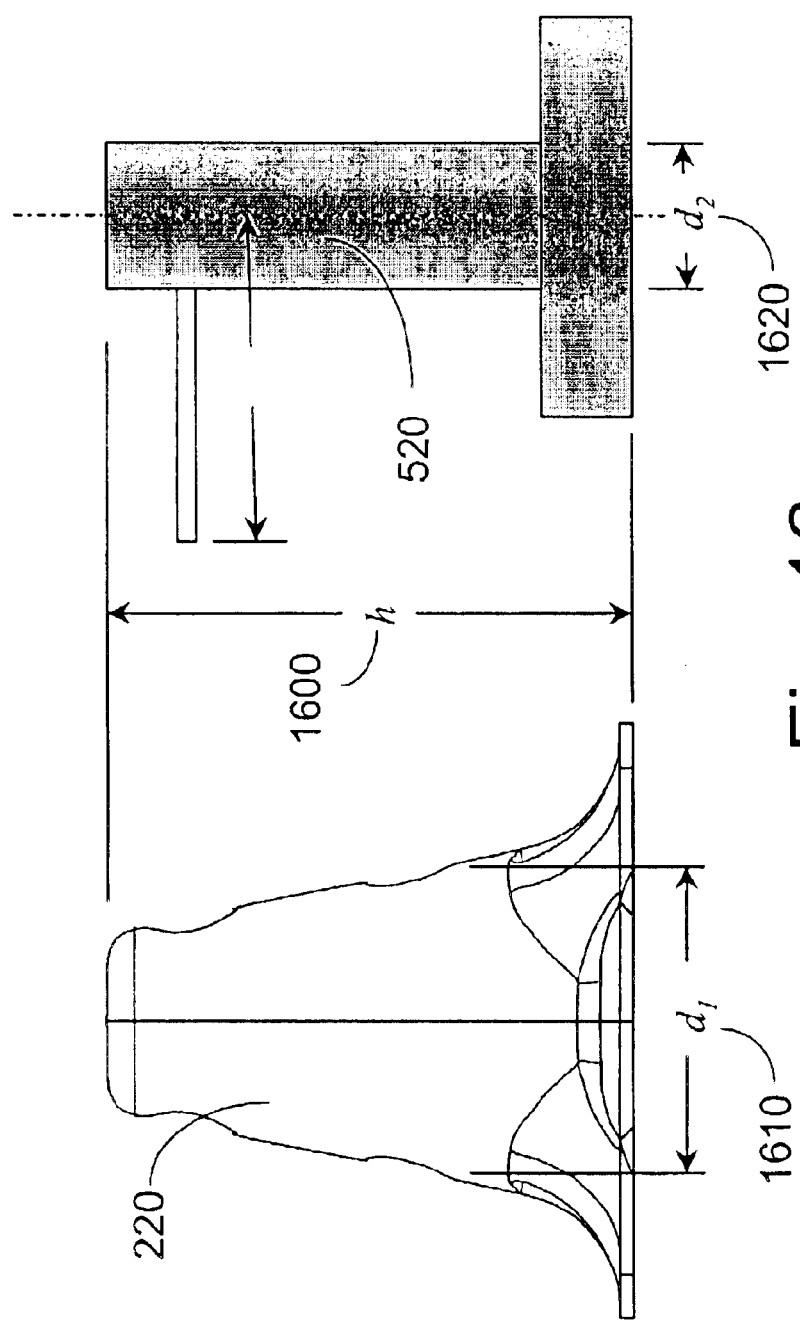

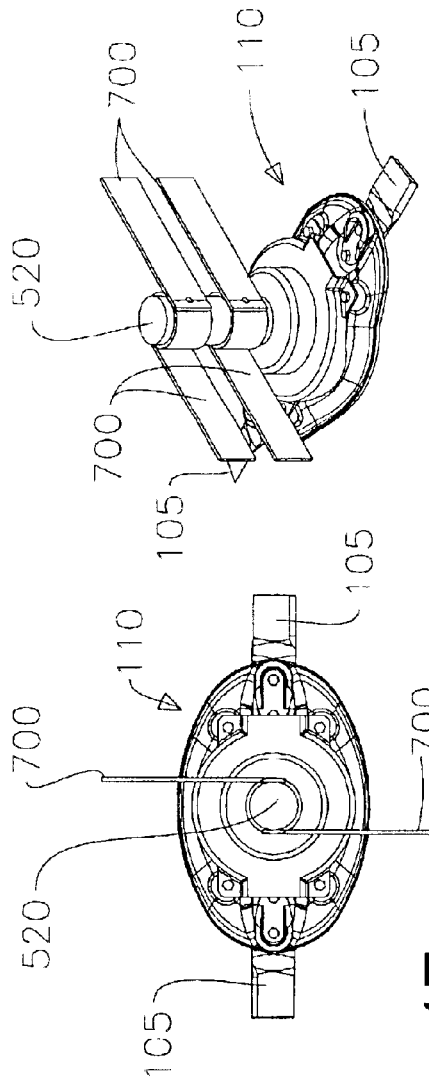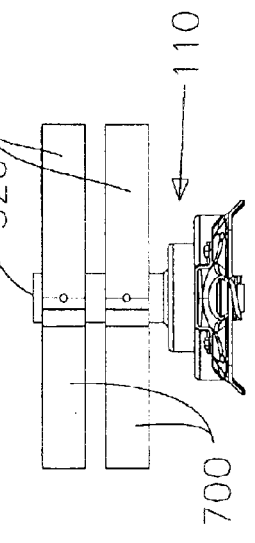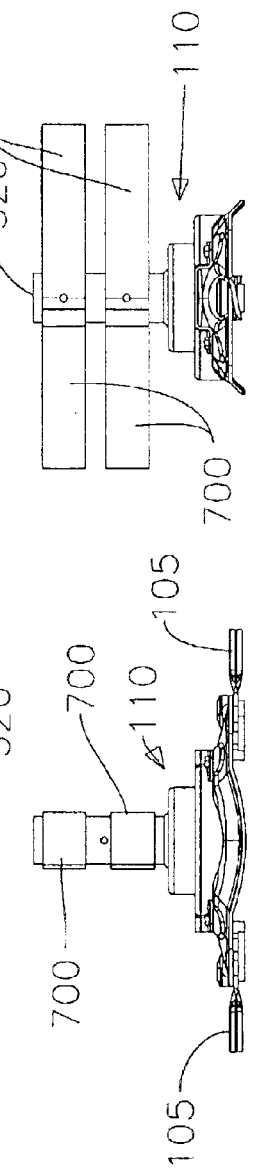

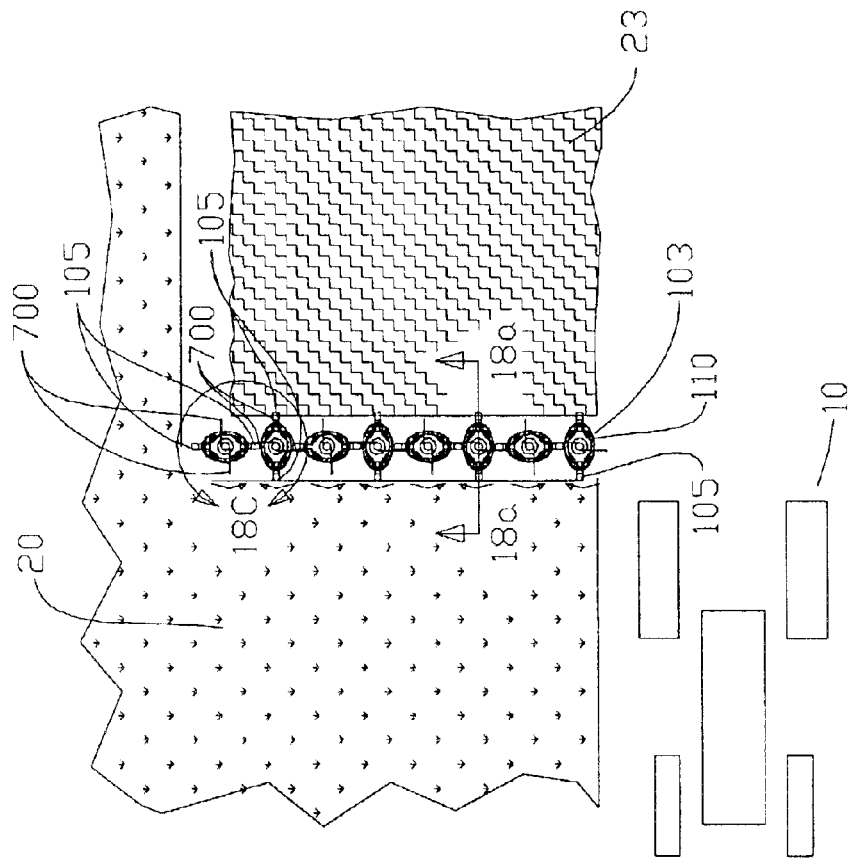
Fig. 18
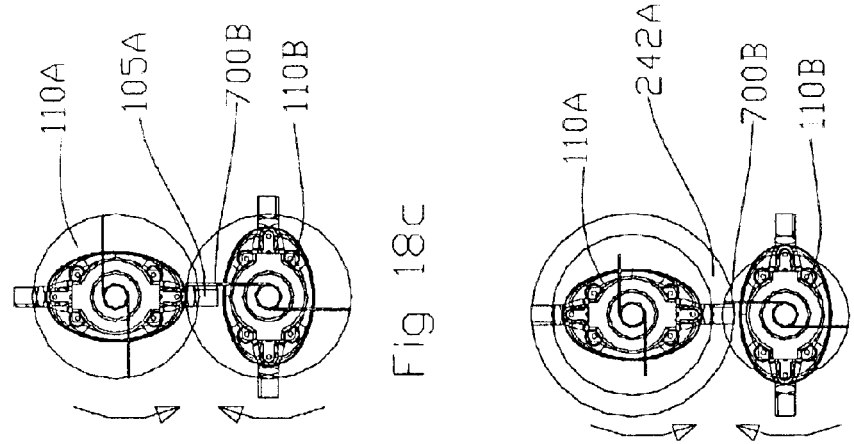
Fig 18c
Fig. 18d

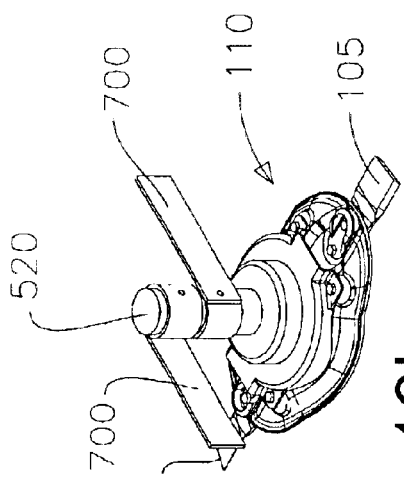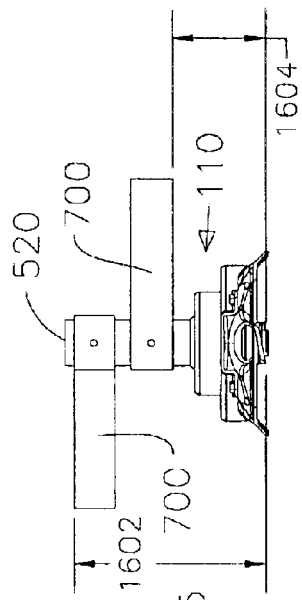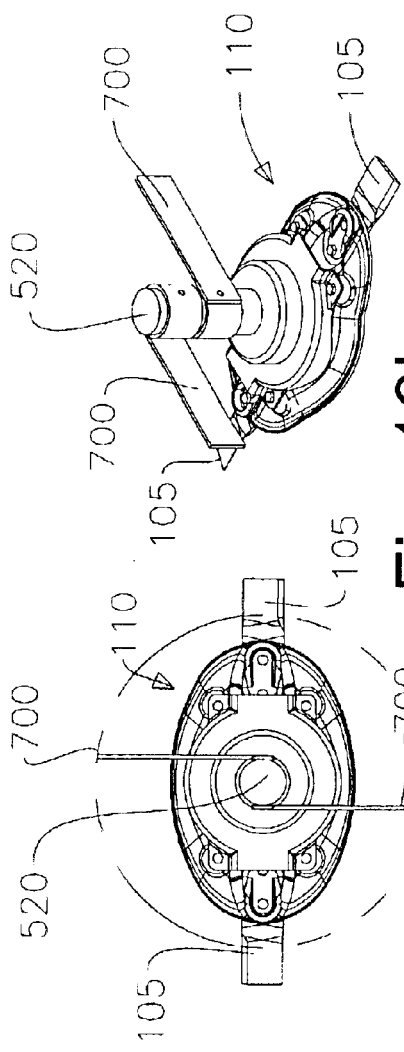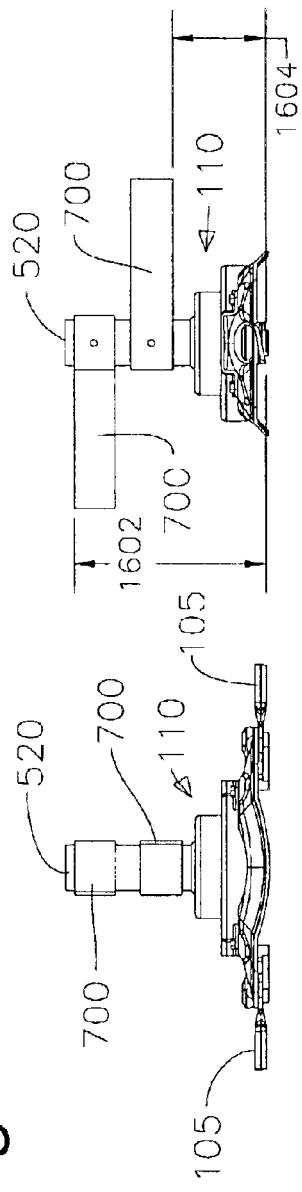

FORAGE CONDITIONER-TEDDER

BACKGROUND OF THE INVENTION

1. Field of the Invention

The present invention relates generally to farm machinery. More particularly the present invention relates to hay and forage equipment and a method and apparatus for decreasing the drying time for hay and other forage crops that are mown.

2. Background Art

In the past, hay and other forage crops were mown in the field and allowed to drop into a swath where they were mown for drying. There is a significant risk in many parts of the country and world that hay will be rained on before it is sufficiently dry to bale using this traditional method. Therefore, in order to speed this process, a variety of equipment has been invented and used comprising two types of operation:

1. conditioning, which is the crimping/crushing of the stems or scuffing of the waxy outer surface to enhance the transport of moisture out of the cells, and
2. tedding, which is a process of fluffing the swath to expose more of it to the air.

Usually, the conditioning operation is performed in conjunction with the original mowing process and the tedding operation is a separate operation.

There are two basic mowing technologies currently in use, including sickle bar mowers and rotary disc mowers. Rotary disc mowers are becoming the preferred technology in many areas, and are typically offered in two configurations: as a mower or as a mower/conditioner. A 3-point mounted disc-type mower/conditioner 100 is shown in FIG. 1. Disc mowers and mower conditioners are also mounted onto wheeled trailers. The 3-point mower/conditioner 100 is mounted to the 3-point hitch 12 of a tractor (not shown) with a frame 115 and is driven via a Power Take Off (PTO) shaft 120. It is comprised of two basic components, a cutter bar 102 and a conditioning/crushing device 130.

The Cutter bar 102 is comprised of a number of discs 110 powered from the PTO shaft 120 through the V-Belt drive 122 to a gear drive arrangement that powers the disc drive shafts 200 shown in FIG. 2 illustrating a single disc 110. Each disc is rotatably mounted in the cutter bar 102, wherein they rotate about a shaft 200. Disc drive shafts are typically driven by a gear train comprising a series of spur gears, or a gear train comprising one common main shaft with a bevel gear drive for each disc drive shaft. The thickness of this drive train is kept at a minimum to minimize the affect on flow of material over the cutter bar as it is being cut. Two knives 105 are pivotally attached to each disc 110 with fasteners 210. An extension 220 can be fastened to and extend above each disc 110. The extension may be a truncated cone shape, a right circular cylinder shape, or another right cylindrical shape. The knives 105 sweep out a mowing area 242 that is defined by a pair of concentric circles defined by the innermost and outermost cutting edges. These concentric circles have radii, $r_{min}$ 230 and $r_{max}$ 240, respectively.

The illustrated mower/conditioner 100 has a conditioning/crushing device 130 for conditioning the forage after it has been cut by the cutter bar 102, to accelerate drying. A crushing device 130 may comprise a pair of crimping rollers, or a flail-type roller. The power required to rotate such a crushing device 130 is transferred with an intermediate shaft 125.

A disc mower is similar, with the exception that it does not include a crushing device. FIG. 1a illustrates the cutter bar 102 of a disc mower in operation as it is being towed through a field by a tractor 10. This cutter bar is comprised of four pairs of counter-rotating discs 110. The discs are forced to counter-rotate and remain in-time with the other discs, by the gear drive connecting the drive shafts 200 (FIG. 2). The timing control of the discs is critical to provide overlap of the mowing areas 242 which is necessary to provide adequate mowing. The cutter bar 102 illustrated in FIG. 1a further comprises one extension 220, mounted to the disc farthest from the tractor 10.

Extension 220 is included to assist in moving the cut crop. The standing crop is illustrated 20, as well as the cut material 22. The discs 110, without extensions, allow the crop to flow directly over the top and the resulting swath of cut material 22 is as wide as the width of standing material being cut. However, the disc 110 with extension 220 moves material to the side, resulting in a narrowing of the swath of cut material 22. This narrowing provides for an area 24 where there is no cut material 22. This provides a separation between the cut crop 22 and the standing crop 20 so that the cut crop 22 does not intermingle with the standing crop 20, which could cause difficulties when cutting the standing crop 20. It further provides an area for the tractor tire to run without driving on cut crop 22.

In a mower conditioner, extensions 220 are often used to narrow the swath so that the conditioning element, similar to crushing device 130, can be narrower than the cutter bar.

FIG. 1b further illustrates the flow of the crop as it is cut. The standing crop 20 is impacted by a knife 105 when its stem falls within the mowing area 242 of a disc 110. Upon impact, the stem is cut and the crop tends to be propelled rearward, with the cut edge leading (rearward). It is further lifted, due to the geometry of the disc, such that it will become airborne before falling back to the ground. A cover 124 is provided over the top of the cutter bar to control the cut crop. The cut material 22 is then deposited onto the ground, lined-up consistently, as illustrated.

The tedding process is performed to fluff-up the swath of cut material, at least partially by disrupting this consistent orientation, and is typically performed as a separate operation. The drawbacks of this approach are several and comprise:

1. multiple passes over the field means more compaction of the soil and more damage to the plant life;
2. multiple passes also increases the machinery operator's time in the field and fuel usage; and
3. handling the hay and operating on it results in leaf loss, and consequent loss of feed value—especially when the hay has dried down significantly before the additional operation.

There is, therefore, a need for a method and device for mowing, conditioning, and tedding in a single pass. There is also need for the machinery carrying out these simultaneous operations to be rugged, simple, inexpensive, and light.

SUMMARY OF THE INVENTION

A purpose of this invention is to provide a simple and effective method and apparatus for both tedding and conditioning of forage crops during the mowing operation. An additional purpose of the present invention is to carry out the mowing, conditioning, and tedding operation using a simple, rugged, and light apparatus.

Modern disc mowers are comprised of a set of discs having multiple (commonly two) knives per disc. The discs are arranged in a line perpendicular to the direction of travel and are spaced sufficiently closely so that the paths of the blades overlap sufficiently so that there are no missed areas in the mowing. Cutting action is by the spinning discs, bringing the knives in contact with the forage. With a standard disc mower, the vegetation falls with the stems substantially parallel to one another. This is not an ideal arrangement for drying.

To reduce or eliminate the above drawback to simple mowing, an extension (which may be shaped like a truncated cone or a right-circular cylinder) is added to the top of all the discs, extending upward several inches. Protrusions, substantially perpendicular to the axis of rotation, such as tines, straps, or flaps are added to these extensions. These protrusions act in two ways:

1. They bend, crimp, and/or crush the stems and/or scuff the waxy surface layer off the stems.
2. They encourage scattering due to the centrifugal force and/or air currents they set up.

The scattering discourages the crop from bunching around the cutters as well as encouraging random settling of the crop on the ground, enhancing air flow through the mown crop.

The protrusions may be tine or tine-like, the slender nature of these tines causes bending or crimping of the stems. The protrusions may also be rigid or flexible strap (steel, rubber, fabric, etc.). The wider surface of this type of protrusion causes less crimping, but enhances air flow and causes random scattering of the crop. A combination of these types of protrusions on each extension may be used to take advantage of both actions. When a wider strap is used, they may be angled such that they cause additional lift, further encouraging scattering.

Typically, there are protrusions along the height of the extensions, providing their advantages to tall crops. An additional crop deflector is positioned on the shielding above the cutter bar to ensure that a significant percentage of the crop is forced into contact with a projection.

The novel features which are believed to be characteristic of this invention, both as to its organization and method operation together with further objectives and advantages thereto, will be better understood from the following description considered in connection with the accompanying drawings in which presently preferred embodiments of the invention are illustrated by way of example. It is to be expressly understood however, that the drawings are for the purpose of illustration and description only and not intended as a definition of the limits of the invention.

BRIEF DESCRIPTION OF THE DRAWINGS

FIG. 2 is a plan view of a prior art cutter disc for a disc mower;

FIG. 4 show several views of a third embodiment of the invention;

FIG. 5 show several views of a fourth embodiment of the invention;

FIG. 6 show several views of a fifth embodiment of the invention;

FIG. 8 show several views of a seventh embodiment of the invention;

FIG. 9 show several views of a eighth embodiment of the invention;

FIG. 10 show several views of a ninth embodiment of the invention;

FIG. 16 shows both types of extensions with some characteristic dimensions;

FIG. 17 show several views of an eleventh embodiment of the invention;

FIG. 18 is a plan view of a disc mower cutter bar of the present invention in operation;

FIG. 18c is a close-up of a pair of counter-rotating discs of a cutter bar of the present invention with protrusions of a first length;

FIG. 18d is a close-up of a pair of counter-rotating discs of a cutter bar of the present invention with protrusions of a second length; and FIG. 19 show several views of a first embodiment of the invention.

BEST MODE FOR CARRYING OUT THE INVENTION

Figure 1:
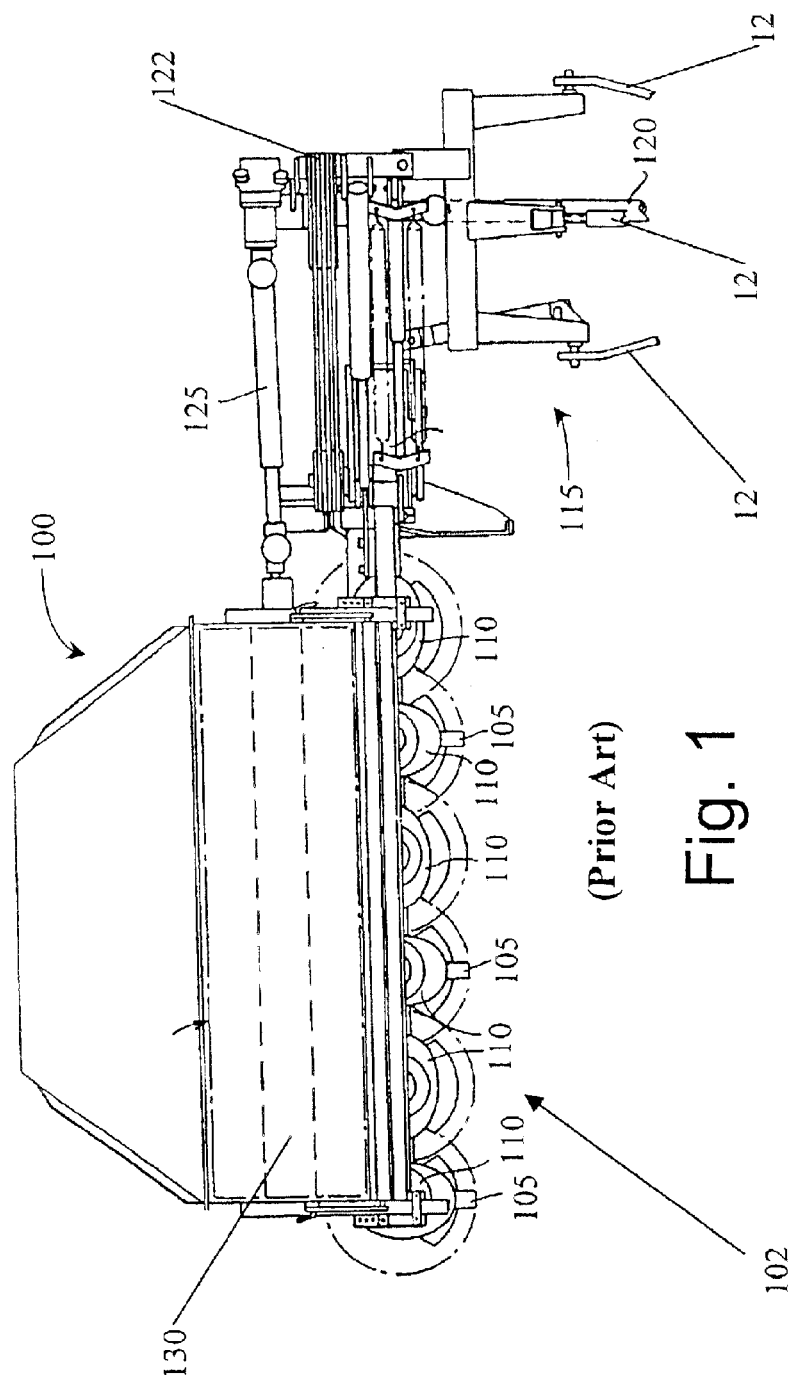
FIG. 1 is a plan view of a prior art disc mower conditioner.
Figure 1A:
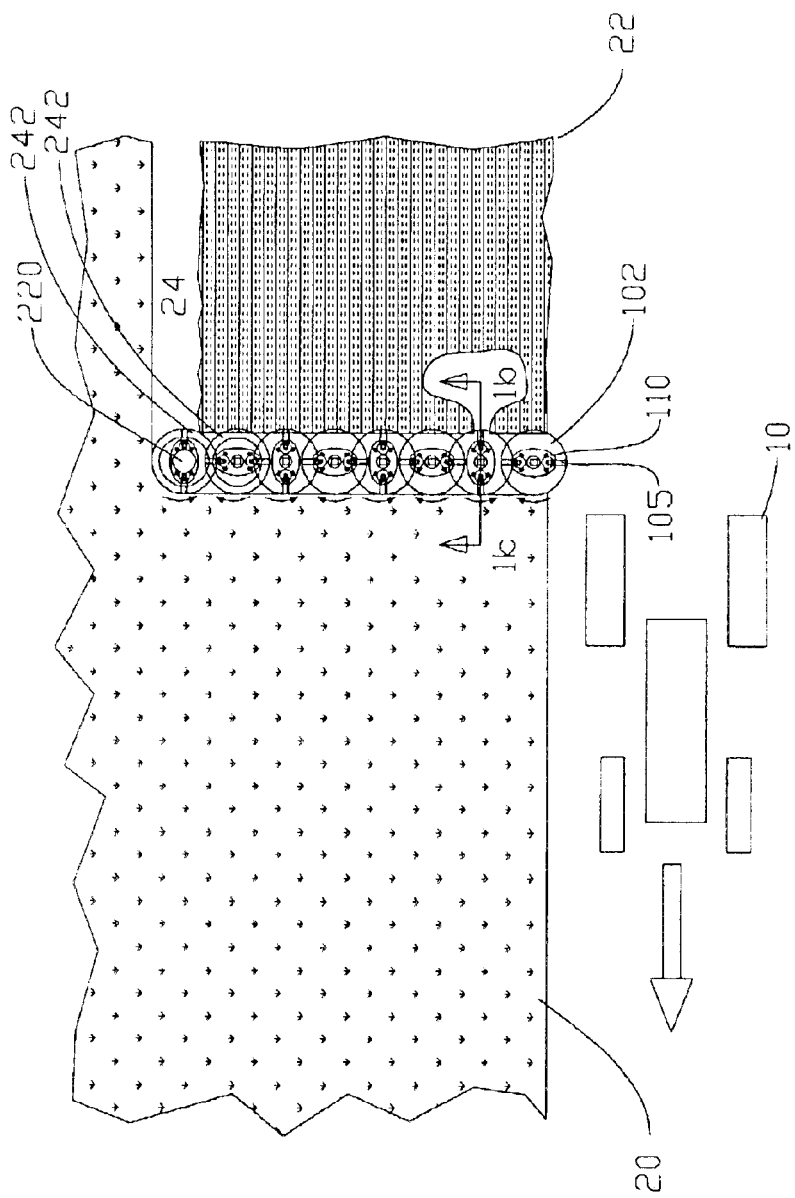
FIG. 1a is a plan view of a prior art disc mower cutter bar in operation.
Figure 1B:
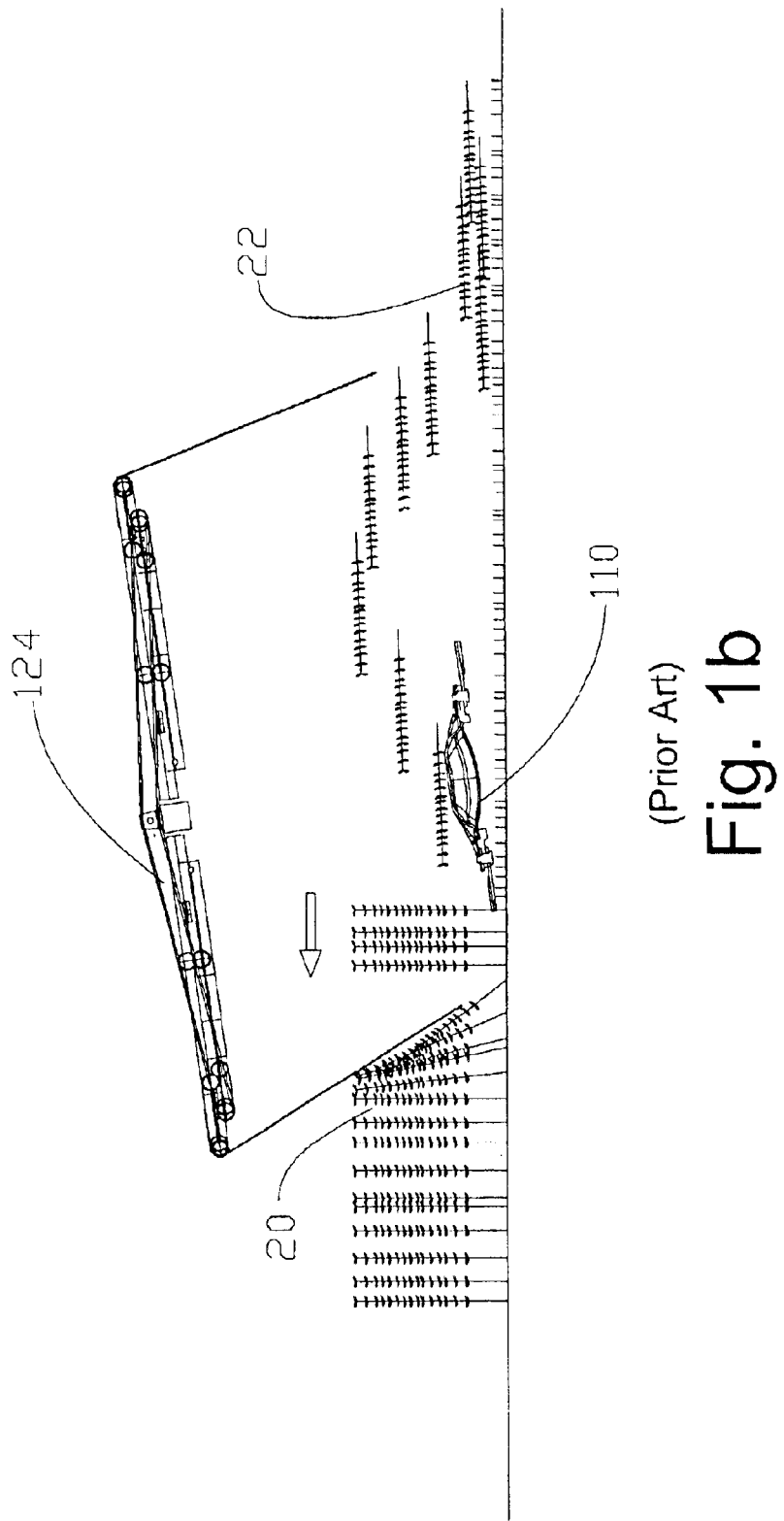
FIG. 1b is a cross-section taken along section line 1b—1b in FIG. 1a of the prior art disc mower cutter bar in operation.

The present invention provides an apparatus capable of cutting, tedding and conditioning a crop in a single pass, and which is powered by the standard gear drive system of the cutter bar of a disc mower. FIG. 18 illustrates a disc mower cutter bar 103 being towed through a field with a tractor 10, similar to that previously illustrated in FIG. 1a. The cutter bar 103 may be supported by a 3-point frame, as is illustrated in FIG. 1, or by a wheeled trailer, not shown. The supporting frame is not important to the current invention. The cutter bar 103 in FIG. 18 includes additional elements of a first embodiment of the present invention, comprising projections 700.

FIG. 19 further illustrates this first embodiment. Each disc 110 is supported and driven in the same manner as the prior art discs, by a disc drive shaft powered by a low-profile gear drive train, not shown in this figure. This embodiment further comprises an extension 520 that is coaxial with the axis of rotation of the disc 110 which can be a separate component that attaches to the disc, or could alternately be an extension of the disc drive shaft. This embodiment further comprises two strap type protrusions 700 that are attached to the extension 520 at two different vertical positions. The height of the top of the highest strap 1602, H, is between 7 and 10 inches, preferably 8.75". The height of the bottom of the lowest strap 1604, $H_b$, is between 2 and 6 inches, preferably 3.625". FIG. 18c illustrates this preferred embodiment with protrusions 700 extending out radially to a radius between radii, $r_{min}$ 230 and $r_{max}$ 240 previously defined in FIG. 2. The radial extension of the strap type projections 700 can easily be modified, as necessary, to meet the needs of specific crop materials and may extend to a radius less than $r_{min}$ 230 or more than $r_{max}$ 240. FIG. 18d illustrates protrusions of a length such that they project out to the effective radius of the pivotal attachment points of the knives. This embodiment results in the projection 700B of disc 110B overlapping the mowing area 242A of disc 110A.

In this first embodiment two straps 700 are located in an offset position, from the knives 105, rotated 90 degrees. As described earlier for the prior art, the discs operate in counter-rotating pairs, timed 90 degrees apart, in order to provide adequate overlap, for example illustrated as discs 110A and 110B in FIG. 18c. This arrangement of discs and knives, combined with the orientation of the strap type protrusions 700, results in the strap-type protrusion of one disc being positioned directly over the knife of the mating disc, as they rotate to the closest position. This is illustrated in FIG. 18c with the path of knife 105A of disc 110A overlapping the path of strap 700B of disc 110B. This configuration will result in one strap 700B contacting and assisting to transport the material previously cut by one knife 105A. The amount of crop contact will be influenced by the type of projection, the length of the projection, the height of the projection as measured from the location of the knife, and the total effective width of the projection(s). Many different configurations are possible, each providing a different characteristic.

A second embodiment of the present invention is shown in FIG. 3. A plan view is shown at FIG. 3a. Two knives 105 are symmetric about the minor axis of the approximately elliptic shaped disc 110. This invention is not limited to the shape of the disc, the number of knives, or their locations. In this embodiment, the protrusions 300 are rigid straps configured as flat-plate airfoils (see FIG. 3b) which, due to aerodynamic lift, provide airflow in an axial direction. In the case of FIG. 3, the airflow is largely upward, but this invention is not limited thereto.

Figure 3B:
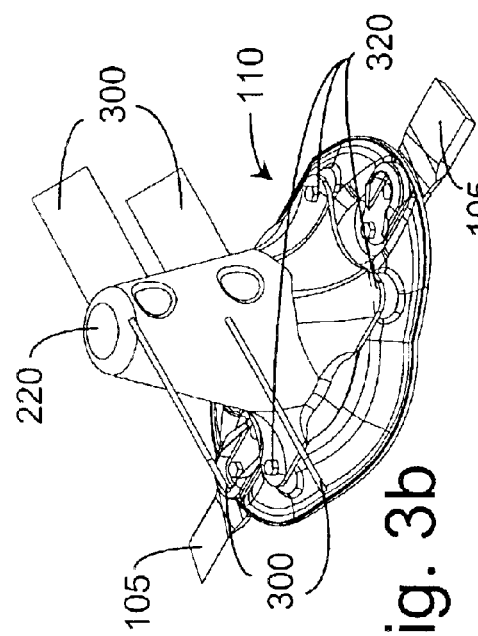
FIG. 3 show several views of a second embodiment of the invention.
Figure 3D:
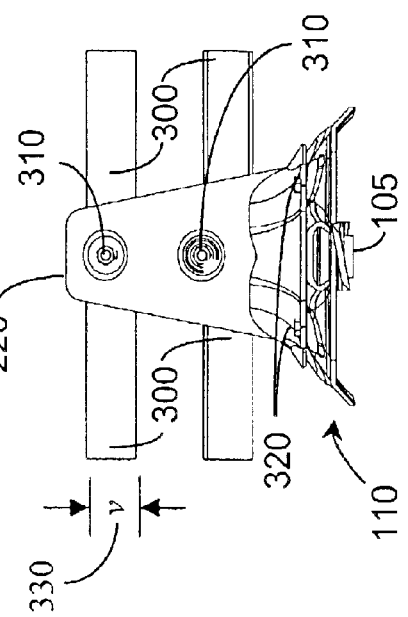
Figure 3A:
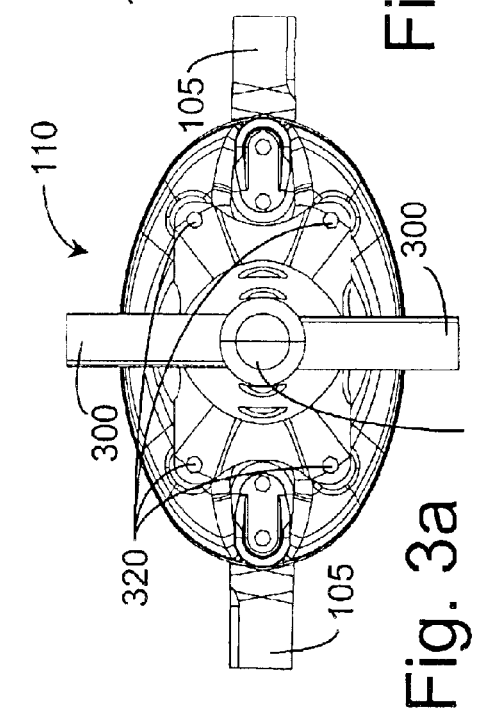
Figure 3C:
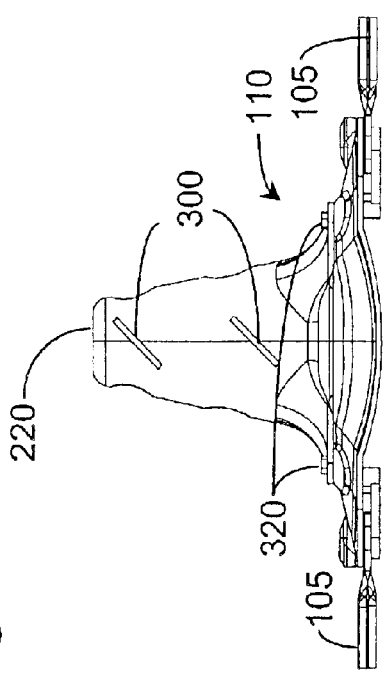
Figure 7B:
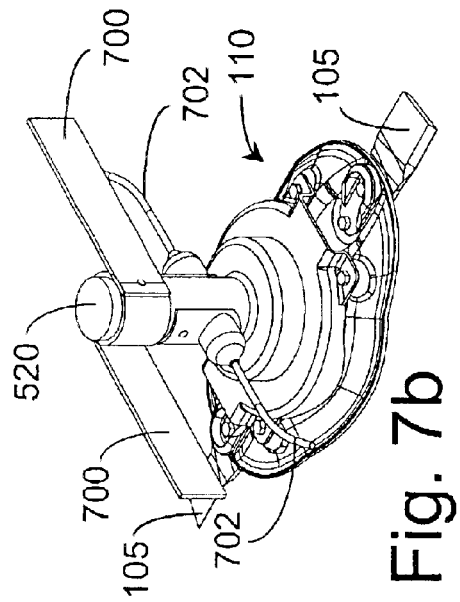
FIG. 7 show several views of a sixth embodiment of the invention.
Figure 7D:
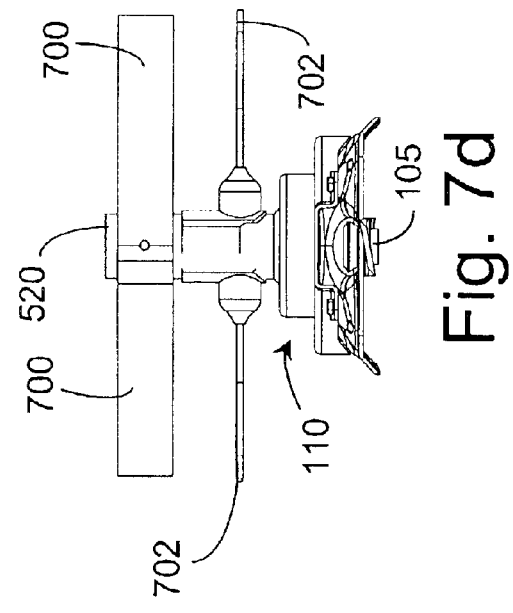
Figure 7A:
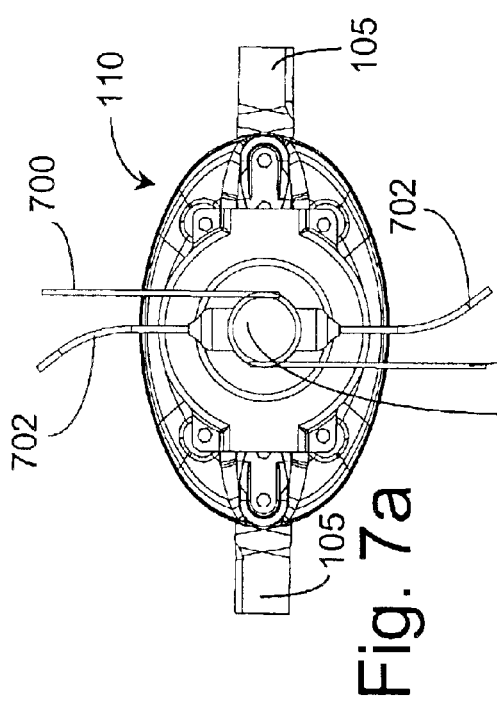
Figure 7C:
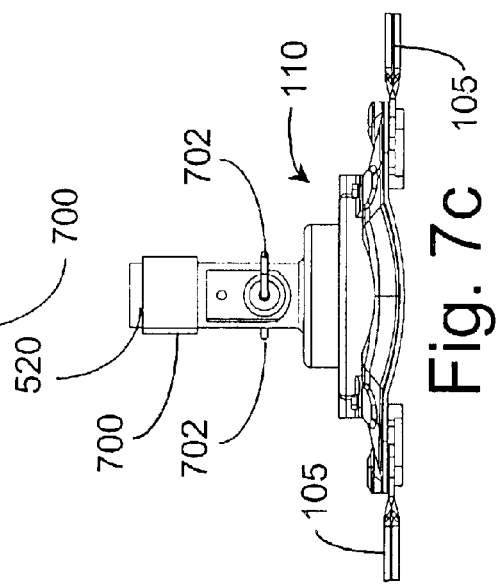
Figure 11A:
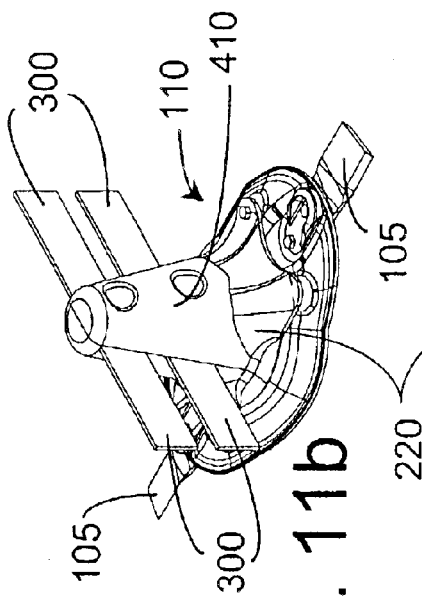
FIG. 11 show several views of a tenth embodiment of the invention.
Figure 11B:
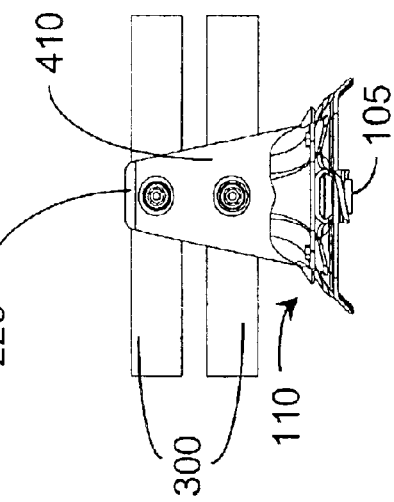
Figure 11C:
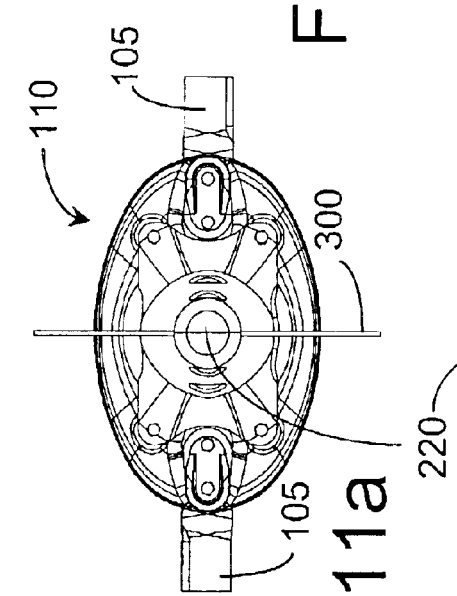
Figure 11D:
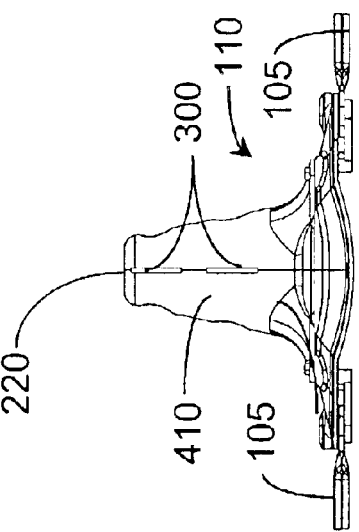
Figure 13:
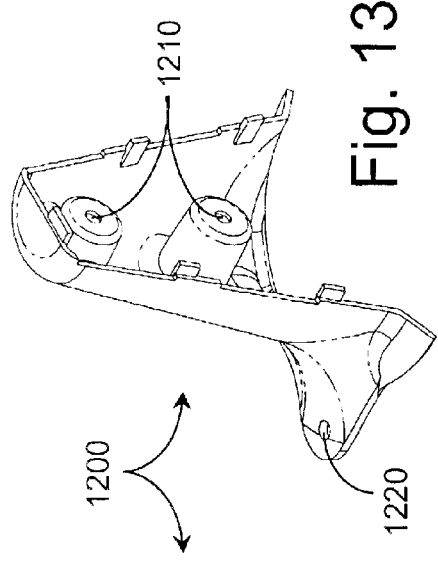
FIG. 13 is a perspective view of half a truncated cone extension without protrusions shown.
Figure 15:
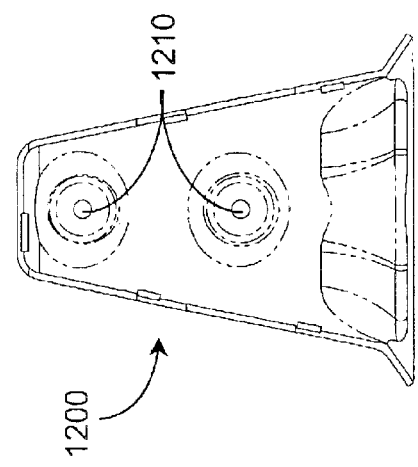
FIG. 15 is a frontal elevation view of half a truncated cone extension without protrusions shown.
Figure 12:
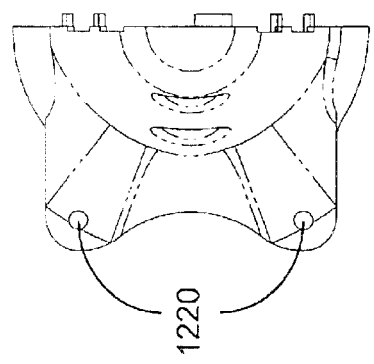
FIG. 12 is a plan view of half a truncated cone extension without protrusions shown.
Figure 14:
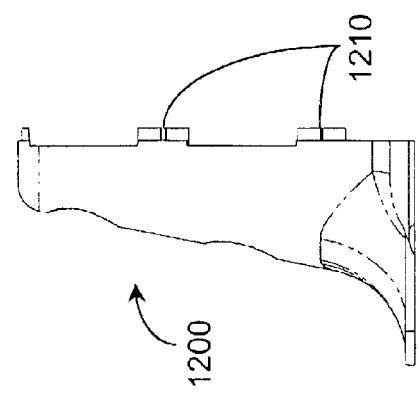
FIG. 14 is a side elevation view of half a truncated cone extension without protrusions shown.

In the side-elevation view of FIG. 3c, it is clear that the truncated cone shaped extension 220 is split vertically to permit the attaching of the protrusions 300. In the frontal-elevation view of FIG. 3d, fasteners 310 (in this case, hex bolts, but rivets may also be used) for attaching the two halves of the truncated cone shaped extension 220 and for stabilizing the protrusions 300 are apparent.

The truncated cone shaped extension 220 is operably affixed to the disc 110 by fasteners 320 as shown. These fasteners 320 may be chosen from a list comprising hex bolts and rivets.

An important aspect of the present invention is the width of the protrusions 300. In the case of flat protrusions 300 installed at an angle such as those shown in FIG. 3, the projection of the width in a vertical plane is used. This vertical width is denoted v 330 in FIG. 3d.

A third embodiment of the present invention is depicted in FIG. 4. The disc 110, blades 105, and truncated cone extension 220 are all as before. Unlike FIG. 3, a single unit 410 comprises the protrusions 400 and a sleeve that fits over and engages the truncated cone extension 220. The single unit 410 could alternatively be constructed to attach directly to the disc 10, such that the additional truncated cone extension 220, as a separate piece, is not required. This single unit 410 may be made of a flexible material such as rubber, fabric reinforced rubber, nylon, or plastic; or a rigid material such as cast iron or steel.

The protrusions 400 are made like a web, with gussets between pairs of protrusions 400 and being of the same unit, thereof.

In FIG. 5, a fourth embodiment is shown. The extension 520 is shown as having a right circular cylinder shape, including a right circular cylinder shaped foot having a larger diameter. The cylindrical extension is, again, operably affixed to the disc 110 by fasters 320 such as hex bolts or rivets. The protrusions 500, as seen in FIGS. 5b and 5d, are bristle-like and made of flexible material such as plastic or nylon. Stiffeners 510 provide a stable object for fastening in the cylindrical extension 520, as well as adding strength and stiffness to the bristle-like protrusions 500.

A fifth embodiment is shown in FIG. 6. Again, the protrusions 600 may be made of a flexible material such as rubber, fabric reinforced rubber, nylon, or plastic; or a rigid material such as steel. Each protrusion 600 is operably pivotally attached to the cylindrical extension 520 at pivots 610. Centrifugal force will aid in keeping the protrusions 600 oriented substantially radially outward when in operation, yet the protrusions 600 will give when they meet sufficient resistance. This protects the protrusions 600, as well as softens the impact on the forage material. It will be readily seen in FIG. 6 that there are three protrusions 600 at each elevation on the cylindrical extension 520, as well as protrusions 600 at three elevations on the cylindrical extension 520. At each level, the protrusions are evenly spaced (120°) from one another.

In FIG. 7, a sixth embodiment is illustrated. Here, a combination of protrusion styles are used, simultaneously. Two tine-type protrusions 702 are used on the bottom, while two strap type protrusions 700 are used on the top. The tine protrusion 702 is similar to that used on hay rakes, and may be rubber or spring mounted. The strap protrusion 700, as before, may be constructed of a flexible material such as rubber, fabric reinforced rubber, nylon, or plastic; or a rigid material such as steel.

The configuration of protrusions shown in FIG. 7 is, preferably, mounted on a cylindrical extension 520, rather than a truncated cone style extension.

A seventh embodiment, as shown in FIG. 8, is similar to the embodiment shown in FIG. 7. In this case, only a single tine type protrusion 702 and a single strap-type protrusion 700 are used on each cylindrical extension 520. As can readily be seen in FIG. 8, these two protrusions 702, 700 are operably affixed to the cylindrical extension 520 180° relative to one another.

In FIG. 9, an eighth embodiment is shown wherein tine-type protrusions 702 are used, exclusively. There are two at each of two levels on the cylindrical extension 520. These tine protrusions 702 are oriented at the same angular locations as the cutting knives 105. As before, these tines 702 may be rubber or spring mounted.

An ninth embodiment is depicted in FIG. 10. This embodiment is almost identical to the seventh embodiment shown in FIG. 9. The difference is the tine protrusions 702 are oriented 90° from the cutting knives 105. This produces different forage dynamics than when the tine protrusions 702 are at the same angular locations as the knives 105. The extension 520 is, again, a right circular cylinder.

A tenth embodiment is shown in FIG. 11. Here, as in the third embodiment of FIG. 4, a single unit 410 comprises the protrusions 400 and a sleeve that drops over the truncated cone extension 220. This single unit 410 may be made of a flexible material such as rubber, fabric reinforced rubber, nylon, or plastic; or a rigid material such as cast iron or steel.

The truncated cone extension 220 could alternatively be constructed to provide support for protrusions 400, such that the additional single unit 410, as a separate piece, is not required. An example of this construction is the truncated cone extension 220 detailed in FIGS. 12–15. It can be constructed of a metallic material, a polymeric material such as plastic or nylon, but is preferably constructed as a die cast hard plastic component. As can be seen, the truncated cone extension 220 is made in halves, with only one half 1200 being shown in these figures. The two identical halves 1200 of the truncated cone extension 220 are fastened together using hex-headed bolts or rivets (not shown) passed through bolt-holes 1210. The same fasteners may also affix and stabilize the protrusions 300, 400 that may pass between and be clamped by the two halves 1200. The protrusions 300, 400 in this embodiment may be constructed of a hard plastic material, or preferably of a flexible rubber belting material.

The truncated cone extensions 220 are anchored to the discs 110 by hex bolts or rivets through anchoring bolt-holes 1220.

The two types of extensions: the truncated cone extension 220 and the cylindrical extension 520 are shown in FIG. 16. The height of the extensions 220, 520 is h 1600, as shown. The diameter of each is a characteristic diameter. For the truncated cone extension 220, the characteristic diameter, $d_1$ 1610, is the mean diameter of the truncated cone, located approximately one third of the distance from the disc 110. The characteristic diameter, $d_2$ 1620, for the cylindrical extension 520 is the diameter of the upper cylinder as shown. The ratio, h/d, for the extension, regardless of type, shall be greater than unity for the present invention.

Additionally, a representative protrusion length, l, from the axis of rotation of the disc 110 and extension 220, 520 is shown. For particular crops this length, l, shall be greater than or equal to the inner radius, $r_{min}$ 230. For other types of crop material the length l, may be less than the inner radius, $r_{min}$ 230, in the range of 0.75 times $r_{min}$ 230.

An eleventh embodiment is shown in FIG. 17, similar to the first configuration described in FIG. 19, but including four straps rather than the previously described two.

Figure 18A:
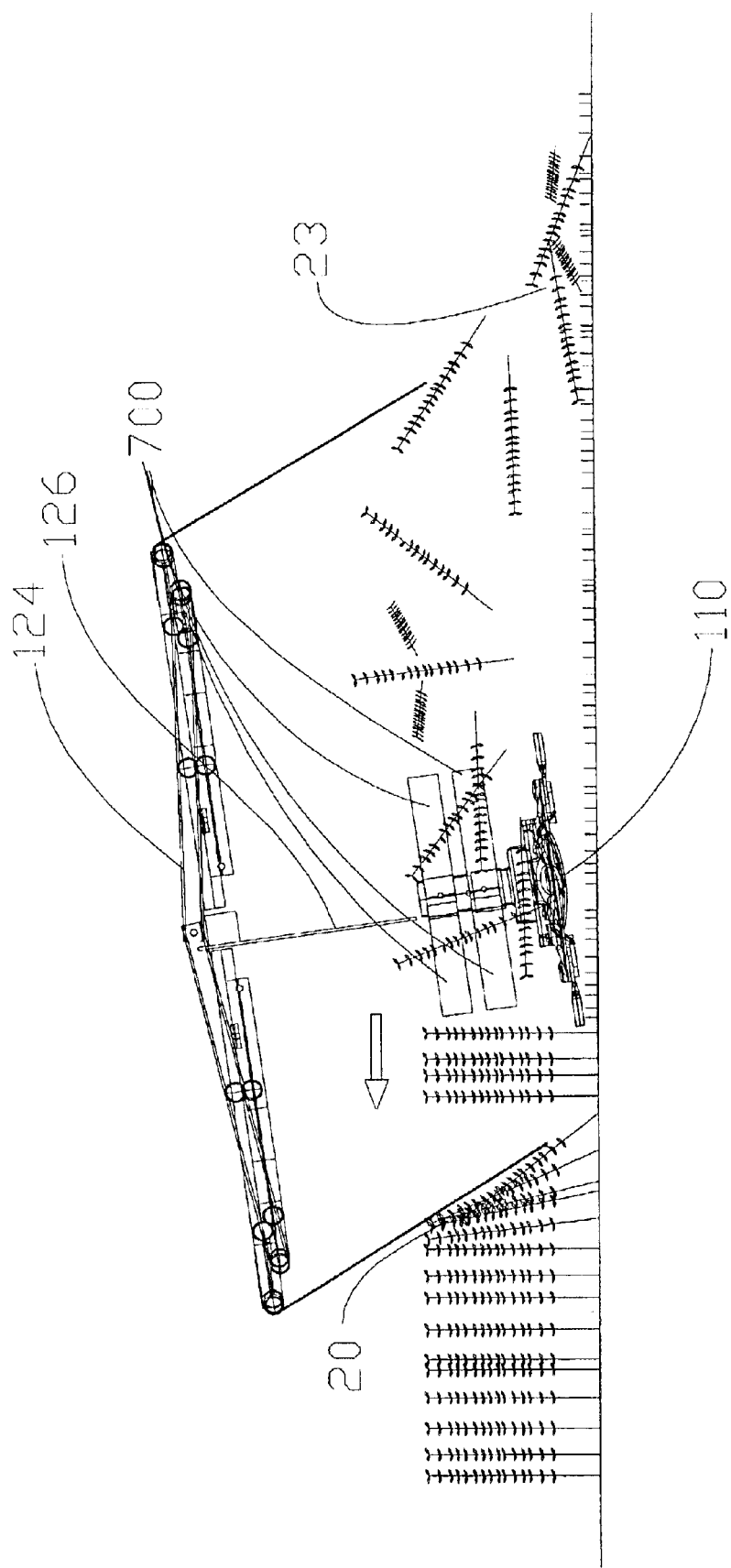
FIG. 18a is a cross-section taken along section line 18a—18a in FIG. 18 of a disc mower cutter bar of the present invention in operation.

Each of the previously described embodiments will interact with the crop and knives in a slightly different manner, however the desired effect of each is similar, and illustrated in FIG. 18a. This figure further illustrates the first embodiment of the projections 700, their interaction with the crop and an additional crop deflector 126. As the standing crop is cut it will tend to be lifted by disc 110. If it is lifted to height above the highest strap 700, it will encounter a crop deflector 126. This will force the cut crop back down, into contact with a strap 700.

The straps 700 will contact the crop at random points along the length of the crop, unlike the knives which always contact the uncut crop 20 near to the ground. The projections 700 of the present invention provide several advantages resulting from this contact with the crop. This includes propelling the crop into the swath 23 in manner that it will lay in random orientation. This random orientation will allow the swath 23 to be less dense than if the orientation is consistent, and will permit more air flow through the swath 23, resulting in a greater drying rate. Another advantage, which will depend on the type of projection employed, is the potential to condition the crop when the projection impacts it. By selecting the appropriate type(s) of projections, and orienting them appropriately on the cutter bar, the present invention provides a cutter bar that is capable of mowing, conditioning and tedding.

The above embodiments are the preferred embodiments, but this invention is not limited thereto. Several embodiments have been illustrated and the differences described. It is, therefore, apparent that many modifications and variations of the present invention are possible in light of the above teachings. Thus, it is to be understood that within the scope of the appended claims, the invention may be practiced otherwise than as specifically described.

What is claimed is:

1. A method of providing for conditioning and tedding a forage crop while mowing said crop with a disc mower, the method comprising the steps of:
    (a) operably affixing an extension to each disc of the disc mower such that each extension rotates on an axis of rotation of the disc to which the extension is operably attached;
    (b) constructing at least one strap-type protrusion out of a flexible material;
    (c) operably attaching the at least one strap-type protrusion to said extension, extending substantially radially outward from the axis of rotation and rotating the at least one strap-type protrusion about the axis of rotation; and
    (d) orienting each at least one strap-type protrusion such that the at least one strap-type protrusion has an axial height exceeding a tangential thickness.

2. The method of claim 1 wherein the extension is shaped substantially as a truncated cone shape with a height, h, and an average diameter, d, wherein a ratio h/d is at least equal to 1.0.

3. The method of claim 1 wherein a shape of the extension is a right cylinder.

4. The method of claim 3 wherein the right cylinder is a right circular cylinder.

5. The method of claim 1 wherein the protrusions are operably rotatably mounted to the extension.

6. The method of claim 1 wherein:
    (a) the extension has a height, h;
    (b) at least one protrusion is located at a height at least 0.75 h measured from the disc to which the extension is affixed.

7. The method of claim 1 wherein:
    (a) the extension has a height, h;
    (b) the projections have a vertical width, that is, a width projected on a vertical plane of v; and
    (c) a sum of all vertical widths of all the projections on one side of the extension equal at least 0.25 h.

8. The method of claim 1 including using said apparatus to cut hay.

9. The method of claim 1 wherein the step of operably attaching at least one strap-type protrusion to said extension includes operably attaching at least one flexible belt-type protrusion to the extension.

10. The method of claim 9 wherein the step of operably attaching at least one flexible belt-type protrusion to said extension includes operably attaching at least one rubber belt-type protrusion to said extension.

11. An apparatus for conditioning and tedding a forage crop while mowing said crop with a disc mower, the apparatus comprising:
    (a) an extension, operably affixed to each disc of the disc mower and rotating the extension about an axis of rotation of the disc to which the extension is operably attached; and
    (b) at least one strap-type protrusion, made of a flexible material and operably attached to said extension, extending substantially radially outward from the axis of rotation and rotating about the axis of rotation, each of said at least one strap-type protrusion having a greater axial width than a tangential thickness.

12. The apparatus of claim 11 wherein the extension is shaped substantially as a truncated cone shape with a height, h, and an average diameter, d, wherein a ratio h/d is at least equal to 1.0.

13. The apparatus of claim 11 wherein a shape of the extension is a right cylinder.

14. The apparatus of claim 13 wherein the right cylinder is a right circular cylinder.

15. The apparatus of claim 11 wherein:
(a) the extension has a height, h;
(b) the projections have a vertical width, that is, a width projected on a vertical plane of v; and
(c) a sum of all vertical widths of all the projections on one side of the extension equal at least 0.25 h.

16. The apparatus of claim 11 wherein the at least one strap-type protrusion comprises flexible belting.

17. The apparatus of claim 16 wherein the flexible belting comprises rubber belting.

\* \* \* \* \*